United States Patent
Bryant et al.

(10) Patent No.: US 8,645,588 B2
(45) Date of Patent: Feb. 4, 2014

(54) PIPELINED SERIAL RING BUS

(75) Inventors: Christopher D. Bryant, Austin, TX (US); David Kaplan, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 296 days.

(21) Appl. No.: 12/916,664

(22) Filed: Nov. 1, 2010

(65) Prior Publication Data

US 2012/0110304 A1    May 3, 2012

(51) Int. Cl.
*G06F 3/00*      (2006.01)
*G06F 13/00*     (2006.01)
*G06F 15/00*     (2006.01)
*G06F 15/76*     (2006.01)
*G06F 11/00*     (2006.01)

(52) U.S. Cl.
USPC .......... 710/21; 712/29; 712/9; 714/30; 710/4; 710/30; 710/111

(58) Field of Classification Search
USPC ........ 710/58, 111, 305, 306, 4, 30, 21; 712/9, 712/29; 714/30
See application file for complete search history.

(56) References Cited

U.S. PATENT DOCUMENTS

| | | | |
|---|---|---|---|
| 6,567,883 B1 * | 5/2003 | Dahlen et al. | 710/315 |
| 6,898,542 B2 * | 5/2005 | Ott et al. | 702/108 |
| 2006/0031593 A1 * | 2/2006 | Sinclair | 709/251 |
| 2006/0218448 A1 * | 9/2006 | Allue et al. | 714/45 |
| 2008/0016254 A1 | 1/2008 | Kruger et al. | 709/251 |
| 2009/0271553 A1 * | 10/2009 | Gang et al. | 710/305 |

* cited by examiner

*Primary Examiner* — Farley Abad

(57) ABSTRACT

The present invention provides embodiments of an apparatus used to implement a pipelined serial ring bus. One embodiment of the apparatus includes one or more ring buses configured to communicatively couple registers associated with logical elements in a processor. The ring bus(s) are configured to concurrently convey information associated with a plurality of load or store operations.

20 Claims, 4 Drawing Sheets

PIPELINED SERIAL RING BUS

BACKGROUND OF THE INVENTION

1. Field of the Invention

This invention relates generally to processor-based systems, and, more particularly, to a pipelined serial ring bus for use in a processor-based system.

2. Description of the Related Art

Conventional processor-based systems typically include one or more processors such as a central processing unit (CPU), a graphical processing unit (GPU), an accelerated processing unit (APU), and the like. The processor(s) are configured to access instructions and/or data that are stored in a main memory and then execute the instructions and/or manipulate the data. The processor(s) include one or more processor cores that are used to execute the instructions and/or manipulate the data. Most (if not all) processor(s) also implement a hierarchical (or multilevel) cache system that is used to speed access to the instructions and/or data by storing selected instructions and/or data in the caches. Conventional processor(s) also typically include numerous other physical and/or logical blocks that are used to implement other functionality used by the processor. Exemplary physical and/or logical blocks include data caches, retirement blocks, dispatch blocks, decoders, flops, tag arrays, translation lookaside buffers, and the like.

The functional blocks in the processor can be configured using registers that are connected to the functional blocks. For example, model specific registers (MSRs) can be used to store bits of information that are used to configure the associated functional block. A typical MSR includes 64 bits that can be used to define or initialize a state of the associated functional block. Microcode implemented in the processor core(s) can access the information in the MSRs and can be used to set the appropriate values of the bits in each MSR, e.g., to configure the functional blocks for particular applications or conditions within the processor. The microcode can access information in the MSRs and convey new information to the MSRs over one or more buses that communicatively couple the processor core(s) to the other functional blocks in the processor. For example, the processor core(s) and the functional blocks can be communicatively coupled by one or more buses. Each element that is coupled to the bus has an address so that instructions and/or data can be placed on the bus and delivered to the MSR indicated by the bus address. One instruction at a time is placed on the bus, which simplifies the microcode that is used to set the values in the MSRs.

SUMMARY OF EMBODIMENTS OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, an apparatus is provided for a pipelined serial ring bus. One embodiment of the apparatus includes one or more ring buses configured to communicatively couple registers associated with logical elements in a processor. Each ring bus is configured to concurrently convey information associated with a plurality of load or store operations. Embodiments of techniques for manufacturing the apparatus are also provided.

In another embodiment, a processing unit is provided for implementing a pipelined serial ring bus. One embodiment of the processing unit includes a processor core, a load/store unit implemented in the processor core, and a plurality of registers associated with a corresponding plurality of logical elements in the processing unit. This embodiment of the processing unit also includes one or more ring buses configured to communicatively couple the registers. Each ring bus is configured to concurrently convey information associated with a plurality of load or store operations.

In yet another embodiment, a method is provided for implementing a pipelined serial ring bus. One embodiment of the method includes concurrently conveying information associated with a plurality of load or store operations over a ring bus configured to communicatively couple the registers. The registers are associated with a corresponding plurality of logical elements in a processor.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
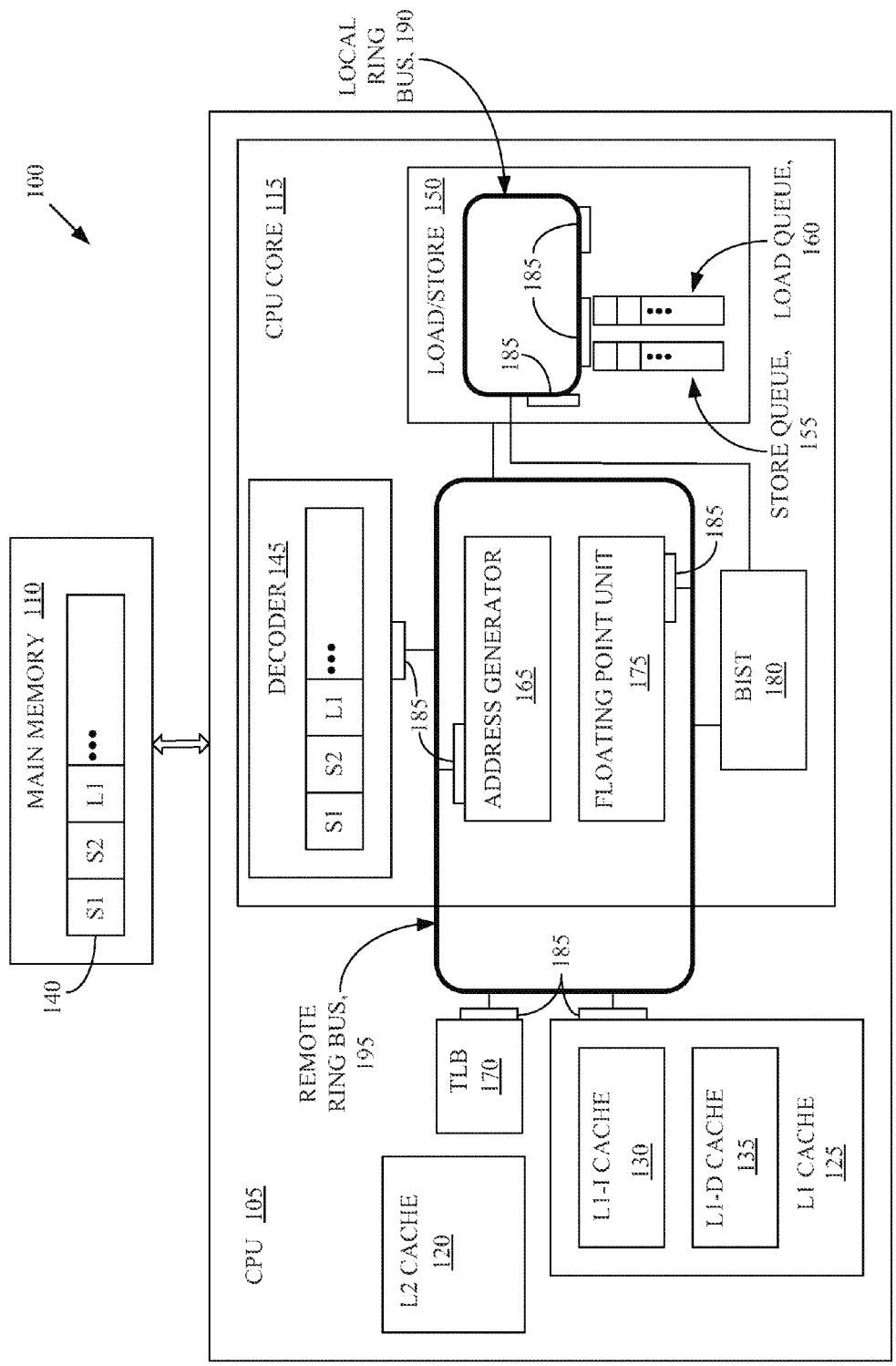
FIG. 1 conceptually illustrates a first exemplary embodiment of a semiconductor device.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present application describes embodiments of serial ring buses that may be used to pipeline loads and stores to access state registers around a processor-based system that may be implemented on a chip. The inventors of the subject matter described in the present application recognized that serial ring buses that only allow a single operation on the bus at a time can become a bottleneck that decreases the operational efficiency of the processor-based system. For example, boot times can be significantly reduced by instruction bottlenecks on the serial ring bus. The present application therefore describes embodiments of serial ring buses that allow more than one load or store to be concurrently placed on the bus. Allowing multiple concurrent instructions to be on the bus at one time can significantly decrease boot times so that the boot code setup can exit faster. Placing multiple concurrent instructions on the bus at once can also speed up other operations such as save/restore mechanisms so that the processor can enter/exit sleep modes faster. One embodiment of the serial ring bus is configured to electronically and/or communicatively couple configuration registers for logical elements in the processor so that information destined for more than one of the registers can be concurrently conveyed over the bus.

FIG. 1 conceptually illustrates a first exemplary embodiment of a semiconductor device 100 that may be formed in or on a semiconductor wafer (or die). The semiconductor device 100 may be formed in or on the semiconductor wafer using well known processes such as deposition, growth, photolithography, etching, planarising, polishing, annealing, and the like. In the illustrated embodiment, the device 100 includes a processor, such as a central processing unit (CPU) 105, that is configured to access instructions and/or data that are stored in the main memory 110. However, as will be appreciated by those of ordinary skill the art the CPU 105 is intended to be illustrative and alternative embodiments may include other types of processor such as a graphics processing unit (GPU), a digital signal processor (DSP), an accelerated processing unit (APU), a co-processor, an applications processor, and the like. In the illustrated embodiment, the CPU 105 includes at least one CPU core 115 that is used to execute the instructions and/or manipulate the data. Many processor-based systems include multiple CPU cores 115. The CPU 105 also implements a hierarchical (or multilevel) cache system that is used to speed access to the instructions and/or data by storing selected instructions and/or data in the caches. However, persons of ordinary skill in the art having benefit of the present disclosure should appreciate that alternative embodiments of the device 100 may implement different configurations of the CPU 105, such as configurations that use external caches.

The illustrated cache system includes a level 2 (L2) cache 120 for storing copies of instructions and/or data that are stored in the main memory 110. In the illustrated embodiment, the L2 cache 120 is 16-way associative to the main memory 110 so that each line in the main memory 110 can potentially be copied to and from 16 particular lines (which are conventionally referred to as "ways") in the L2 cache 120. However, persons of ordinary skill in the art having benefit of the present disclosure should appreciate that alternative embodiments of the main memory 110 and/or the L2 cache 120 can be implemented using any associativity. Relative to the main memory 110, the L2 cache 120 may be implemented using smaller and faster memory elements. The L2 cache 120 may also be deployed logically and/or physically closer to the CPU core 115 (relative to the main memory 110) so that information may be exchanged between the CPU core 115 and the L2 cache 120 more rapidly and/or with less latency.

The illustrated cache system also includes an L1 cache 125 for storing copies of instructions and/or data that are stored in the main memory 110 and/or the L2 cache 120. Relative to the L2 cache 120, the L1 cache 125 may be implemented using smaller and faster memory elements so that information stored in the lines of the L1 cache 125 can be retrieved quickly by the CPU 105. The L1 cache 125 may also be deployed logically and/or physically closer to the CPU core 115 (relative to the main memory 110 and the L2 cache 120) so that information may be exchanged between the CPU core 115 and the L1 cache 125 more rapidly and/or with less latency (relative to communication with the main memory 110 and the L2 cache 120). Persons of ordinary skill in the art having benefit of the present disclosure should appreciate that the L1 cache 125 and the L2 cache 120 represent one exemplary embodiment of a multi-level hierarchical cache memory system. Alternative embodiments may use different multilevel caches including elements such as L0 caches, L1 caches, L2 caches, L3 caches, and the like.

In the illustrated embodiment, the L1 cache 125 is separated into level 1 (L1) caches for storing instructions and data, which are referred to as the L1-I cache 130 and the L1-D cache 135. Separating or partitioning the L1 cache 125 into an L1-I cache 130 for storing only instructions and an L1-D cache 135 for storing only data may allow these caches to be deployed closer to the entities that are likely to request instructions and/or data, respectively. Consequently, this arrangement may reduce contention, wire delays, and generally decrease latency associated with instructions and data. In one embodiment, a replacement policy dictates that the lines in the L1-I cache 130 are replaced with instructions from the L2 cache 120 and the lines in the L1-D cache 135 are replaced with data from the L2 cache 120. However, persons of ordinary skill in the art should appreciate that alternative embodiments of the L1 cache 125 may not be partitioned into separate instruction-only and data-only caches 130, 135. The caches 120, 125, 130, 135 can be flushed by writing back modified (or "dirty") cache lines to the main memory 110 and invalidating other lines in the caches 120, 125, 130, 135. Cache flushing may be required for some instructions performed by the CPU 105, such as a RESET or a write-back-invalidate (WBINVD) instruction.

Processor-based systems utilize two basic memory access instructions: a store that puts (or stores) information in a memory location such as a register and a load that reads information out of a memory location. The CPU core 115 can execute programs that are formed using instructions such as loads and stores. In the illustrated embodiment, programs are stored in the main memory 110 and the instructions are kept in program order, which indicates the logical order for execution of the instructions so that the program operates correctly. For example, the main memory 110 may store instructions for a program 140 that includes the stores S1, S2 and the load L1 in program order. Persons of ordinary skill in the art having benefit of the present disclosure should appreciate that the program 140 may also include other instructions that may be performed earlier or later in the program order of the program 140.

The illustrated embodiment of the CPU core 115 includes a decoder 145 that selects and decodes program instructions so that they can be executed by the CPU core 115. In the illustrated embodiment, the CPU core 115 is an out-of-order processor that can execute instructions in an order that differs from the program order of the instructions in the associated program. For example, the decoder 145 may select and/or decode instructions from the program 140 in the program order and then dispatch, send, or provide the decoded instructions to a load/store unit 150 in the order they are picked by the load/store unit 150. Since the core 115 implements out-of-order processing, the load/store unit 150 may pick the decoded instructions in any order, such as the order L1, S1, S2, which differs from the program order of the program 140 because the load L1 is picked before the stores S1, S2. In the illustrated embodiment, the load/store unit 150 implements one or more store and/or load queues 155, 160 that are used to hold the stores and associated data.

The store queues 155 shown in the illustrated embodiment are used to hold the stores and associated data. The data location for each store is indicated by a linear address, which may be translated into a physical address by an address generator 165 so that data can be accessed from the main memory 110 and/or one of the caches 120, 125, 130, 135. The CPU core 115 may therefore be electronically and/or communicatively coupled to a translation look aside buffer (TLB) 170 that holds information that is used to translate linear addresses into physical addresses. When a store (such as S1 or S2) is picked, the store checks the TLB 170 and/or the data caches 120, 125, 130, 135 for the data used by the store. The store is then placed in the store queue 155 to wait for data. In one embodiment, the store queue may be divided into multiple portions/queues so that stores may live in one queue until they are picked and receive a TLB translation and then the stores can be moved to another queue. In this embodiment, the second queue is the only one that holds data for the stores. In another embodiment, the store queue 155 is implemented as one unified queue for stores so that each store can receive data at any point (before or after the pick).

The load queues 160 shown in the illustrated embodiment are used to hold the loads and associated data. Load data may also be indicated by linear addresses and so the address generator 165 may translate the linear addresses for load data into a physical address using information stored in the TLB 170. In the illustrated embodiment, when a load (such as L1) is picked, the load checks the TLB 170 and/or the data caches 120, 125, 130, 135 for the data used by the load. The load can also use the physical address to check the store queue 155 for address matches. Alternatively, linear addresses can be used to check the store queue 155 for address matches. If an address (linear or physical depending on the embodiment) in the store queue 155 matches the address of the data used by the load, then store-to-load forwarding can be used to forward the data from the store queue 155 to the load in the load queue 160.

The CPU core 115 may also implement other functional elements. In the illustrated embodiment, the CPU core 115 includes a floating point unit 175 that is used to perform mathematical operations on floating point numbers when required by the executed instructions. For example, the floating-point unit 175 may be designed to carry out operations such as addition, subtraction, multiplication, division, and square root. Alternative embodiments of the floating-point unit 175 may also perform various transcendental functions such as exponential or trigonometric calculations. The illustrated embodiment of the CPU core 115 also includes a built-in self test unit (BIST) 180 that is used by the CPU 105 and/or the CPU core 115 to test itself. For example, the BIST unit 180 may be used to confirm or verify normal operation of elements in the CPU 105 on startup, following a reset, and/or when the system 100 exits from a sleep mode, a power saving mode, or some other operational mode.

The various functional elements and/or blocks within the CPU 105 can be configured and/or controlled using information stored in one or more configuration registers associated with each functional element and/or block. In the illustrated embodiment, each functional elements and/or block is associated with one or more model specific registers (MSRs) 185. In the interest of clarity the distinguishing numeral "185" is used to identify all of the MSRs 185 in FIG. 1. However, persons of ordinary skill in the art having benefit of the present disclosure should appreciate that this is not intended to imply that the structures of all of the MSRs 185 are precisely the same. In various embodiments, the different MSRs 185 shown in FIG. 1 may have different sizes and/or may be implemented using different structures or functional elements. The MSRs 185 are used to store bits of information that are used to configure the associated functional block. For example, each MSR 185 may include 64 bits that can be used to define or initialize a state of the associated functional block. However, persons of ordinary skill in the art having benefit of the present disclosure should appreciate that the particular configuration of the MSRs 185 shown in FIG. 1 is intended to be illustrative and not to limit the claimed subject matter. In alternative embodiments, more or fewer MSRs 185 may be coupled to the same or different functional elements and may include more or fewer configuration bits.

In the illustrated embodiment, the CPU 105 implements serial ring buses 190, 195 to pipeline loads and stores to the MSRs 185. The serial ring bus 190 is a local serial ring bus 190 that is used to convey information to the MSRs 185 associated with functional elements within the load store unit 150 such as the queues 155, 160. The serial ring bus 195 is a remote serial ring bus 195 that is used to convey information to the MSRs 185 associated with functional elements that are outside of the load store unit 150. Multiple loads and/or stores can be concurrently placed on the local and/or remote serial ring buses 190, 195, which may convey the loads and/or stores to the appropriate MSR 185, e.g., based on bus addresses associated with the MSRs 185. In one embodiment, the serial ring buses 190, 195 can operate in two different modes: a load/store mode and a BIST mode. When in the load/store mode, the load/store unit 150 can place information onto the serial ring buses 190, 195 so that it can be conveyed to the MSRs 185. In the BIST mode, the BIST unit 180 can place information onto the serial ring buses 190, 195 to convey information used for BIST operations.

In embodiments that use out-of-order processing, dependencies between the loads and/or stores should be respected. For example, before entering the serial ring buses 190, 195, stores may wait in the queue 155 until retirement, but loads can bypass stores if they are not accessing the same registers, e.g., when there is no dependency between the load and the bypassed store. If a load is accessing the same register as a store, e.g., when there is a dependency between the load and the store, and the store is older and comes earlier in program order than the load, then the load is blocked until the store is sent onto the ring bus 190, 195. Once the store is sent the load can follow it onto the corresponding ring bus 190, 195. A state machine may be used to control when to send loads/stores on the local ring bus 190 and/or the remote ring bus 195. The state machine may send completion status reports back to the load store unit 150 upon completion. In one embodiment, the loads may be speculative because they are placed on the ring buses 190, 195 before retirement, whereas the stores are not speculative because they may be placed on the ring buses 190, 195 post-retirement. Thus, in this embodiment, if there is a pipe flush while there are operations on the ring buses 190, 195, the state machine may throw load data away and inform the load store unit 150 to stall until the writes on the buses 190, 195 have completed.

Figure 2A:
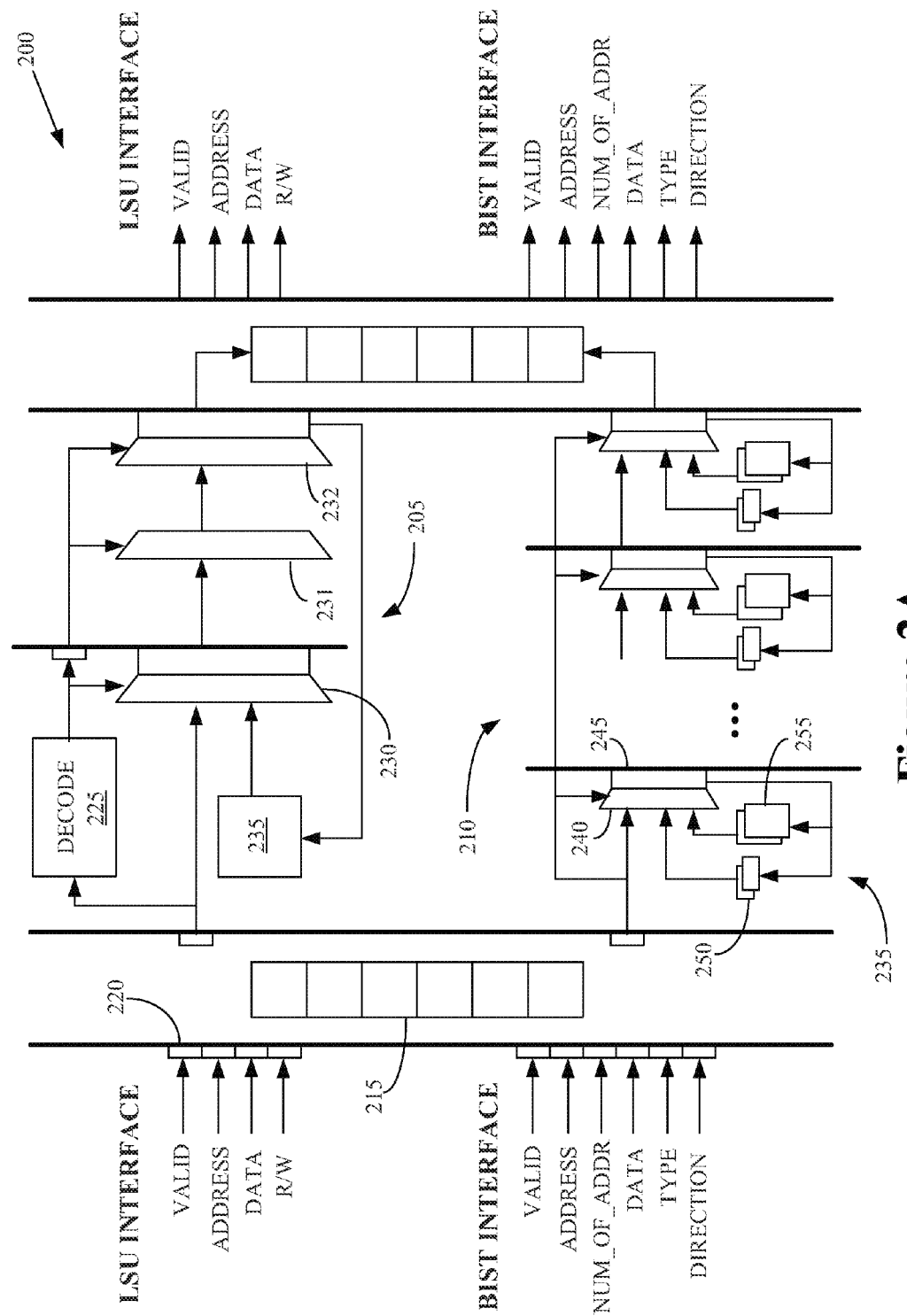
FIG. 2A conceptually illustrates one exemplary embodiment of a serial ring bus that includes a local ring bus and a remote ring bus.

FIG. 2A conceptually illustrates one exemplary embodiment of a serial ring bus 200 that includes a local ring bus 205 and a remote ring bus 210. In the illustrated embodiment, elements in the serial ring bus 200 are depicted in temporal order with the vertical boldfaced lines indicating divisions between time intervals such as clock cycles. Time increases from the left to the right. In the illustrated embodiment, the serial ring bus 200 is a 32-bit ring based bus that is electronically and/or communicatively coupled to MSRs and/or control registers within a processor-based device. In the illustrated embodiment, up to 6 serial ring bus (SRB) transactions may be concurrently outstanding on the bus 200 during each time interval or clock cycle. However, persons of ordinary skill in the art having benefit of the present disclosure should appreciate that the number of concurrent outstanding transactions supported by the bus 200 is a matter of design choice.

The bus 200 can convey configuration information provided by load/store units in one mode and BIST functions for the core arrays in another mode. In one embodiment, the two modes do not overlap because the load store unit may not be configured to handle both BIST and normal transactions at the same time. In the illustrated embodiment, serial ring bus 200 uses a dual ring structure that includes the local serial ring bus 205 and the remote serial ring bus 210. The ring used by a transaction may be determined by one or more bits in the bus address, such as the address bit-8. The local ring bus 205 shown in FIG. 2A exists within the load store unit and has a 2 cycle latency that gathers the data from all the registers within the load store unit and inserts them into a holding queue 215. In the illustrated embodiment, remote serial ring bus 210 has 12 nodes and traverses the processor-based device to each architectural block that contains a MSR.

Timing for the illustrated embodiment of the serial ring bus 200 begins with adding entries into the holding queue 215. In the normal mode, entries are added to the holding queue 215 via the load/store unit (LSU) interface and the information includes a valid bit, a MSR address, the associated data, and a read/write bit. In the BIST mode, entries are added to the holding queue 215 via the BIST interface and the information includes a valid bit, a bus address, a number of addresses indicating a number of devices involved in the test, associated data, a type indicator, and a direction indicator. The entry information is saved or flopped into flip-flops, memories, or registers 220 (only one indicated by a distinguishing numeral in FIG. 2A) during a first clock cycle. In a subsequent clock cycle, the information in the registers 220 is loaded into the holding queue 215. The following table shows one exemplary embodiment of an entry in the holding queue 215.

| Field | Description |
|---|---|
| State | Current state of the entry |
| Address | Register address |
| Data | Data of transaction |
| Restag | Result tag of the transaction |
| St | Type of transaction (store or load) |
| Needflush | Entry needs to be flushed upon completion |

On the local ring 205, the timing is to transmit an address from a selected entry in the holding queue 215 during an address cycle and then one or more data beat cycles are used to convey the data from the holding queue 215 onto the local ring bus 205. In the illustrated embodiment, the timing is one address cycle followed by two data beat cycles. For example, in a first clock cycle, an address is conveyed from a register to a decoder 225 that decodes the provided address so that it can be used as a selector signal for one or more multiplexers, such as the multiplexers 230, 231, 232 shown in FIG. 2A. Input to the multiplexers 230, 231, 232 can be data from the entry in the queue 215 (when a store instruction is used to store data in the MSRs 235) or data read from the MSRs 235 (when a load instruction is used to load data from the MSRs 235). In the first data beat cycle, the decoded address is provided to the multiplexer 230 to select a portion of the data corresponding to a first range of addresses. In the second data beat cycle, the decoded address is provided to the multiplexers 231, 232 to select the portion of the data indicated by the decoded address. For example, if the load/store unit includes approximately 40 MSRs, the multiplexers 230, 231 can be 8:1 multiplexers and the multiplexer 232 can be a 4:1 multiplexer.

The selected data can then be stored in a register and provided to the appropriate location. For example, when a store instruction is being performed, data read from the entry in the queue 215 can be stored in the register 235 indicated by the address. For another example, when a load instruction is being performed, the data read from the register 235 indicated by the decoded address can be written into the appropriate entry in the queue 215. The remote serial ring bus 205 can concurrently convey or handle multiple instructions. For example, if address-data-data timing is used in the local serial ring bus 205, the address for a first instruction is placed on the bus 205 during a first time interval or clock cycle, followed by a first portion of the data during a subsequent second interval or cycle, and followed by a second portion of the data during a subsequent third interval or cycle. The address associated with a second instruction can be decoded using the decoder 225 when the second data beat (or portion of data) associated with the first instruction is being handled by the multiplexers 231, 232.

The remote serial ring bus 210 includes a plurality of nodes 235 that are electronically and/or communicatively coupled in series. In the illustrated embodiment, each node 235 includes a multiplexer 240 and a memory structure such as a register 245 for holding information that is flopped into the registers 245 for storage between clock cycles. Each node 235 is electronically and/or communicatively coupled to registers 250 for storing configuration information used by an associated functional element or block and BIST registers 255 used to perform BIST operations. In one embodiment, the remote serial ring bus 210 supports a series of 12 nodes 235. Persons of ordinary skill in the art having benefit of the present disclosure should appreciate that the structure of the nodes 235 shown in FIG. 2A is intended to be illustrative. In alternative embodiments, more or fewer nodes 235 may be implemented and may have different structures and/or register configurations.

Timing in the illustrated embodiment of the remote serial ring bus 210 includes an address cycle during which an address is conveyed from an entry in the holding queue 215, followed by a "dead" cycle when no information is conveyed from the holding queue 215 onto the remote ring 210, and two data cycles when data is conveyed from the queue 215 (in the case of a store instruction) and/or the registers 250, 255 (in the case of a load instruction) to the nodes 235. In the illustrated embodiment, the first data beat cycle is for the low half of a 64-bit register, the second data beat cycle is for the upper half of a 64-bit register. If the register is 32 bits or less, then for write operations the second data beat may be ignored, and for read operations, the block that owns the register may drive "zeroes" in the second data beat cycle. For read operations, the load store unit can return 64-bits of data, regardless of the size of the register. Data from the queue 215 can therefore be written to the appropriate registers 250, 255 using the address associated with a store instruction and data from the registers 250, 255 can be written into the appropriate entries in the queue 215 using the address associated with a load instruction.

Multiple nodes 235 can concurrently determine whether they are the target of the instruction indicated by different entries in the queue 215 using the associated address information. For example, during a first (address) cycle address information can be conveyed from the queue 215 to the first node 235, which can then decode the address during the dead cycle. The address information can also be provided to the next node 235 along the bus 210 during the dead cycle for the first node 235 so that the next node 235 can decode the address information during the subsequent cycle. The low half of a 64-bit register can be provided as input to the multiplexer 240 during the first data beat cycle and the decoded address can be used as selector input to determine whether the first node 235 is indicated by the decoded address. The high half of the 64-bit register can be provided to the first node 235 during the second data beat cycle and the decoded address can be used as selector input to the multiplexer 240. The low half of the 64-bit register can be provided to the next node 235 during the second data beat cycle of the first node 235 and the next node 235 can use the previously decoded address information as selector input to its multiplexer. Different nodes 235 can therefore be performing different operations associated with the same or different entries in the queue 215 during each cycle so that the bus 210 supports multiple concurrent operations.

Figure 2B:
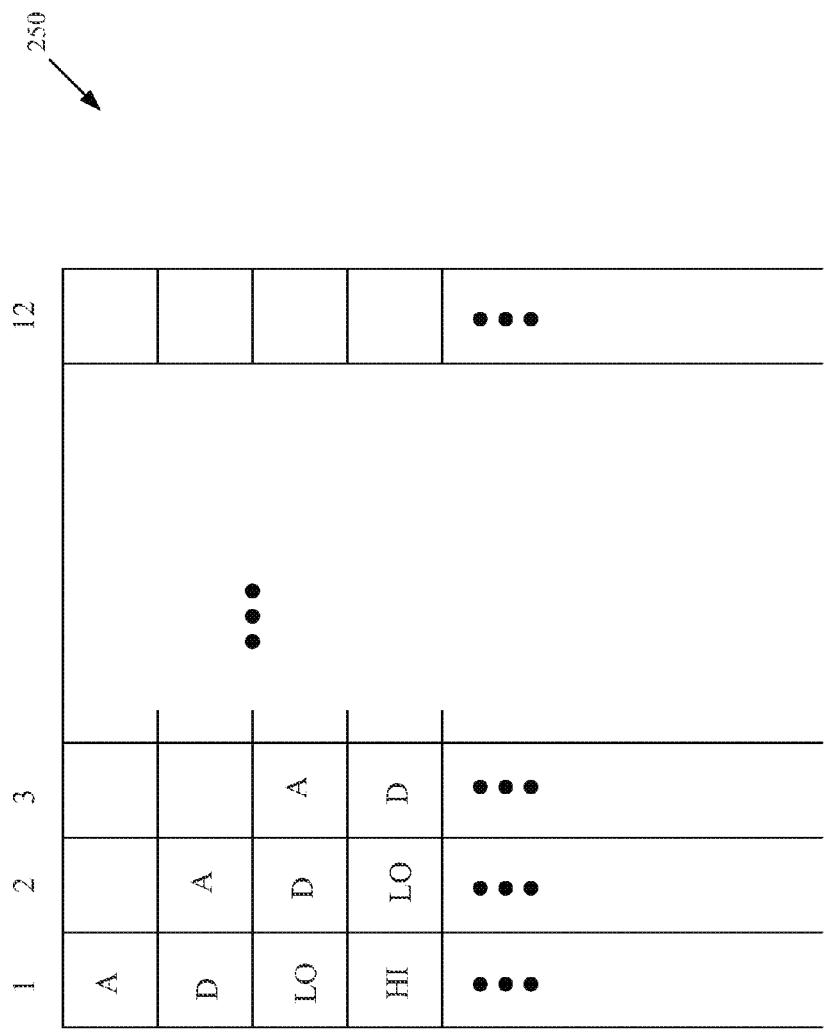
FIG. 2B conceptually illustrates one exemplary sequence of instructions performed concurrently at different nodes in a serial ring bus.

FIG. 2B conceptually illustrates one exemplary sequence 250 of instructions performed concurrently at different nodes in a serial ring bus. In the illustrated embodiment, the serial ring bus includes 12 nodes indicated by numerals across the top of the figure. The clock cycles are indicated by the boxes and increase in the downward vertical direction. In the first clock cycle, the address (A) for an entry is provided to node 1. In the second clock cycle, the address for the entry is provided to node 2 and a dead cycle (D) occurs at node 1. The low portion of the data (LO) for the entry is provided to node 1 during the third clock cycle concurrently with the dead cycle moving to node 2 and the address being provided to node 3. During the fourth clock cycle, the high portion of the data (HI) for the entry is provided to node 1 concurrently with the low portion of the data being provided to node 2, the dead cycle occurring at node 3, etc. Although not depicted in FIG. 2B, operations associated with other entries may also be performed concurrently with the operations associated with the first entry. Operations on other serial ring buses may also be performed concurrently with the operation shown in FIG. 2B, e.g., operations on remote and local serial ring buses may be performed concurrently by the various nodes of these buses.

Figure 3:
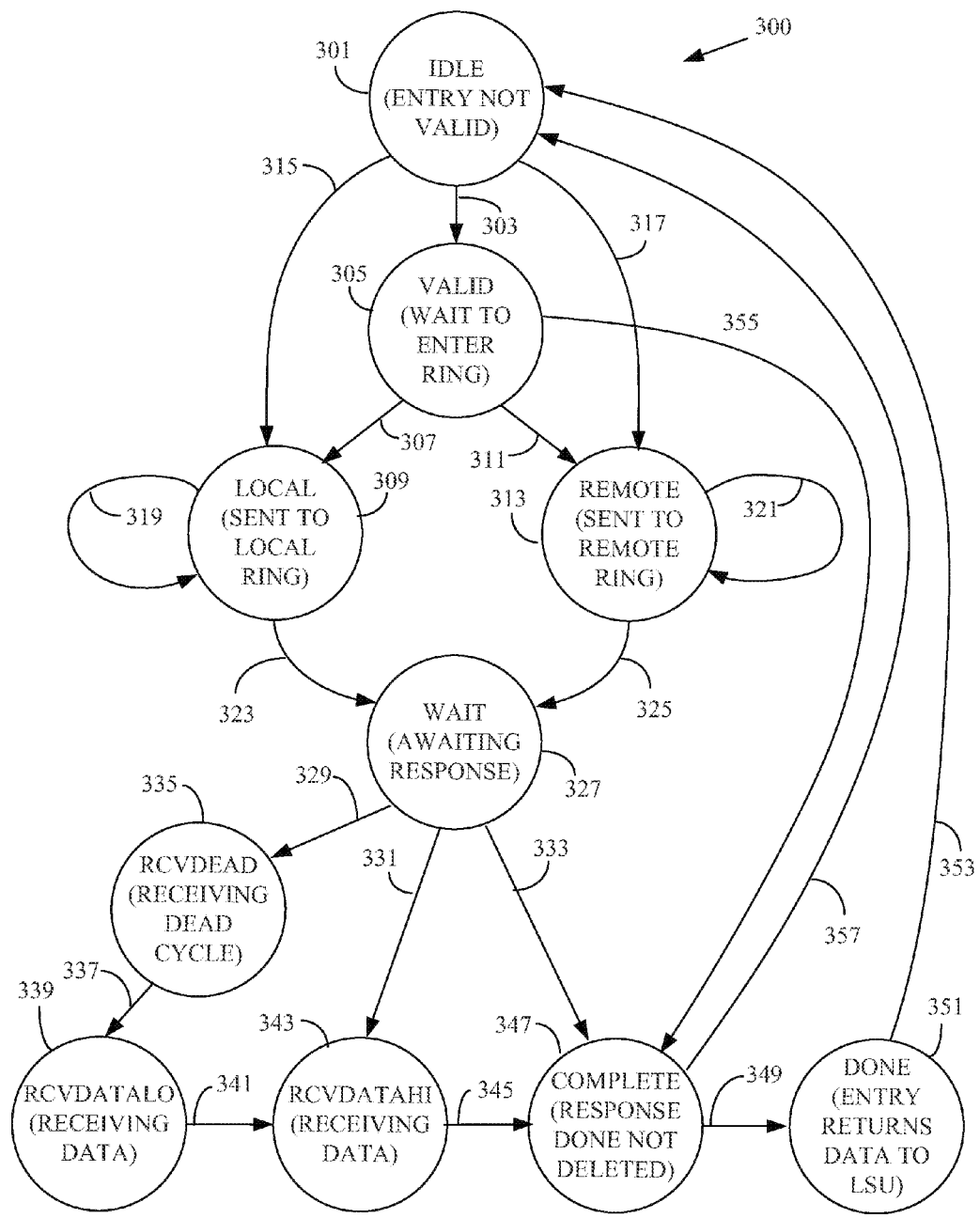
FIG. 3 conceptually illustrates one exemplary embodiment of a state machine that can be used to control operation of a serial ring bus such as the serial ring bus illustrated in FIG. 2A.

FIG. 3 conceptually illustrates one exemplary embodiment of a state machine 300 that can be used to control operation of a serial ring bus such as the serial ring bus illustrated in FIG. 2A. In the illustrated embodiment, the state machine 300 may be applied to each entry in an entry queue, such as the queue 215 shown in FIG. 2A. The sequence or order of the entries in the queue may be determined using various scheduling algorithms. In one embodiment, the state machine may use pointers to detect ordering: InsertPtr, SendPtr, and a DelPtr. The InsertPtr indicates where to add new serial ring bus (SRB) operations into the queue. The SendPtr is used to determine which entry is to be sent on the local or remote ring. The DelPtr is used to determine which entry is being set invalid. An entry is initially in an idle state 301 when the entry does not have valid information. The entry transitions (at 303) from the idle state to a valid state 305 in response to a new operation or instruction being added to the entry. The valid state 305 is used when the entry is valid but the entry is not yet selected to be sent onto the serial ring bus. The state machine 300 transitions (at 307) from the valid state 305 to the local state 309 when the entry starts being sent to the local serial bus ring. The state machine 300 can also transition (at 311) from the valid state 305 to the remote state 313 when the entry starts being sent to the remote serial bus ring. The entry may also transition (at 315 or 317) from the idle state to the local or remote states 309, 313 when a new operation or instruction is added to the entry and the entry begins being sent to the corresponding (local or remote) serial bus ring.

The entry remains (at 319 or 321) in the local or remote states 309, 313 until the information in the entries has all been fed into the corresponding local or remote serial ring bus. For example, the timing of the local serial ring bus may include an address cycle and two data beat cycles, in which case entries remain in the states 309, 313 for at least three cycles so that the information in the entry can be sent to the local ring. For another example, the timing of the remote serial ring bus includes an address cycle, a dead cycle, and two data beat cycles. Entries may therefore remain in the remote state 313 for four cycles so that the information in the entry can be sent onto the remote ring. Once all the information in the entry has been sent onto the corresponding serial ring bus, the state machine 300 can transition (at 323 or 325) from the local state 309 or the remote state 313 to the wait state 327. When the entry is in the wait state 327, it is waiting for the instruction or operation that has been placed on the corresponding serial ring bus to traverse the bus and return to the queue. Transitions (at 329, 331, or 333) out of the wait state 327 depend on the type of instruction and whether the instruction was placed on the remote bus or the local bus.

In the illustrated embodiment, when an entry in the wait state 327 is awaiting a response from a load instruction that was placed on the remote serial ring bus, the entry transitions (at 329) to the RcvDead state 335 when the entry receives information or signaling indicating that address information for the entry has traversed the remote serial ring bus. The entry then transitions between states on subsequent clock cycles. In the RcvDead state 335, the entry is receiving the dead cycle for the load instruction. On the next cycle, the entry transitions (at 337) to the RcvDataLo state 339 to receive the low portion of the data such as the first 32 bits of a 64-bit register that is being loaded into the data portion of the entry. The entry transitions (at 341) to the RcvDataHi state 343 to receive the high portion of the data such as the last 32 bits of the 64-bit register that is being loaded into the data portion of the entry. The entry may transition (at 345) to the completed state 347 when the response is done but it has not yet been deleted (or made invalid) from the queue.

In the illustrated embodiment, when entry in the wait state 327 is awaiting a response from a load instruction that was placed on the local serial ring bus, entry may transition (at 331) to the RcvDataHi state 343 to receive the data that is being loaded into the data portion of the entry. The entry may transition (at 345) to the completed state 347 when the response is done but it has not yet been deleted from the queue. In the illustrated embodiment, when an entry in the wait state 327 is awaiting a response from a store instruction that was placed on either the local or remote serial ring bus, the entry may transition (at 333) from the wait state 327 to the complete state 347 in response to receiving signaling indicated that the local or remote store instruction has been performed.

The entry then waits until the DeletePtr points to it, at which time the entry transitions (at 349) from the completed state 347 to the done state 351. The entry may return data to the load/store unit and transition (at 353) back to the idle state 301 in response to deletion. In one embodiment, the local and/or remote serial ring buses may need to be flushed in certain circumstances. Entries that are in the valid state 305 may therefore transition (at 355) to the complete state 347 in response to signaling indicating that a flush should be performed and when the SendPtr indicates that this entry is to be sent onto the local or remote ring. The entry may then transition (at 357) from the completed state 347 to the idle state 301 in response to the signaling indicating the flush when the DelPtr indicates that this entry is to be deleted or made invalid.

Embodiments of processor systems that can implement pipelined serial ring buses as described herein (such as the processor system 100) can be fabricated in semiconductor fabrication facilities according to various processor designs. In one embodiment, a processor design can be represented as code stored on a computer readable media. Exemplary codes that may be used to define and/or represent the processor design may include HDL, Verilog, and the like. The code may be written by engineers, synthesized by other processing devices, and used to generate an intermediate representation of the processor design, e.g., netlists, GDSII data and the like. The intermediate representation can be stored on computer readable media and used to configure and control a manufacturing/fabrication process that is performed in a semiconductor fabrication facility. The semiconductor fabrication facility may include processing tools for performing deposition, photolithography, etching, polishing/planarizing, metrology, and other processes that are used to form transistors and other circuitry on semiconductor substrates. The processing tools can be configured and are operated using the intermediate representation, e.g., through the use of mask works generated from GDSII data.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. An apparatus, comprising:
a local ring bus that is implemented within a load/store unit in a processor core, wherein the local ring bus is communicatively coupled to a plurality of local registers within the load/store unit, and wherein the local ring bus is configured to convey an address of a first load or store operation associated with one of the plurality of local registers concurrently with data associated with the first load or store operation; and
a remote ring bus that is communicatively coupled to the load/store unit and a plurality of remote registers outside of the load/store unit, wherein the remote ring bus is configured to convey an address of a second load or store operation associated with one of the plurality of remote registers concurrently with data associated with the second load or store operation.

2. The apparatus of claim 1, wherein the local ring bus is configured to convey information provided by the load/store unit in a first mode of operation and information provided by a built-in self test element in a second mode of operation, and wherein the remote ring bus is configured to convey information provided by the load/store unit in a first mode of operation and information provided by the built-in self test element in a second mode of operation.

3. The apparatus of claim 1, further comprising a queue for storing a plurality of entries, wherein each entry is configured to store information associated with one of the plurality of load or store operations, said information comprising the address of the first load or store operation, the data associated with the first load or store operation, the address of the second load or store operation, and the data associated with the second load or store operation.

4. The apparatus of claim 3, further comprising a state machine for controlling operation of said at least one ring bus so that information stored in multiple entries of the queue are concurrently conveyed along said at least one ring bus, and wherein the information stored in each of the multiple entries is conveyed on to said at least one ring bus in separate pluralities of consecutive time intervals.

5. The apparatus of claim 3, wherein each entry in the queue is configured to store information indicating whether the entry is to be flushed upon completion.

6. An apparatus, comprising:
at least one ring bus configured to communicatively couple a plurality of registers associated with a corresponding plurality of logical elements in a processor, wherein said at least one ring bus is configured to concurrently convey information associated with a plurality of load or store operations, wherein the information comprises an address of one of the plurality of registers and data associated with said one of the plurality of registers, and wherein the address and the data are conveyed on to said at least one ring bus in a plurality of consecutive time intervals;
a queue for storing a plurality of entries, wherein each entry is configured to store information associated with one of the plurality of load or store operations, said information comprising data associated with one of the plurality of registers and an address indicating said one of the plurality of registers; and
a state machine for controlling operation of said at least one ring bus so that information stored in multiple entries of the queue are concurrently conveyed along said at least one ring bus, and wherein the information stored in each of the multiple entries is conveyed on to said at least one ring bus in separate pluralities of consecutive time intervals, wherein the state machine controls operation of said at least one ring bus so that an address from a first entry is provided to a first logical element during a first time interval, transmission of information from the queue to the first logical element is bypassed during a second time interval subsequent to the first time interval, and data from the first entry is provided to the first logical element during at least one third time interval subsequent to the second time interval, and wherein the first, second, and third time intervals are consecutive time intervals.

7. The apparatus of claim 6, wherein the state machine controls operation of said at least one ring bus so that the address from the first entry and the data from the first entry are iteratively advanced to subsequent logical elements in subsequent time intervals until they are returned to the first entry in the queue.

8. An apparatus, comprising:
at least one ring bus configured to communicatively couple a plurality of registers associated with a corresponding plurality of logical elements in a processor, wherein said at least one ring bus is configured to concurrently convey information associated with a plurality of load or store operations;
a queue for storing a plurality of entries, wherein each entry is configured to store information associated with one of the plurality of load or store operations, said information comprising data associated with one of the plurality of registers and an address indicating said one of the plurality of registers;
a state machine for controlling operation of said at least one ring bus so that information stored in multiple entries of the queue are concurrently conveyed along said at least one ring bus, wherein the state machine controls operation of said at least one ring bus so that an address from a first entry is provided to a first logical element during a first time interval, transmission of information from the queue to the first logical element is bypassed during a second time interval subsequent to the first time interval, and data from the first entry is provided to the first logical element during at least one third time interval subsequent to the second time interval, wherein the state machine controls operation of said at least one ring bus so that the address from the first entry and the data from the first entry are iteratively advanced to subsequent logical elements in subsequent time intervals until they are returned to the first entry in the queue, and wherein an address from a second entry is provided to the first logical element during a fourth time interval subsequent to said at least one third time interval, transmission of information from the queue to the first logical element is bypassed during a fifth time interval subsequent to the fourth time interval, and data from the second entry is provided to the first logical element during at least one sixth time interval subsequent to the fifth time interval so that information from the first and second entries is concurrently conveyed by said at least one ring bus.

9. A non-transitory computer readable media including instructions that when executed can configure a manufacturing process used to manufacture a semiconductor device comprising:
a local ring bus that is implemented within a load/store unit in a processor core, wherein the local ring bus is communicatively coupled to a plurality of local registers within the load/store unit, and wherein the local ring bus is configured to convey an address of a first load or store operation associated with one of the plurality of local registers concurrently with data associated with the first load or store operation; and
a remote ring bus that is communicatively coupled to the load/store unit and a plurality of remote registers outside of the load/store unit, wherein the remote ring bus is configured to convey an address of a second load or store operation associated with one of the plurality of remote registers concurrently with data associated with the second load or store operation.

10. The non-transitory computer readable media set forth in claim 9, wherein the computer readable media is configured to store at least one of hardware description language instructions or an intermediate representation of said at least one ring bus.

11. The non-transitory computer readable media set forth in claim 10, wherein the instructions when executed configure generation of lithography masks used to manufacture said at least one ring bus.

12. A processing unit, comprising:
a processor core;
a load/store unit implemented in the processor core;
a local ring bus that is implemented within the load/store unit, wherein the local ring bus is communicatively coupled to a plurality of local registers within the load/ store unit, and wherein the local ring bus is configured to convey an address of a first load or store operation associated with one of the plurality of local registers concurrently with data associated with the first load or store operation; and a remote ring bus that is communicatively coupled to the load/store unit and a plurality of remote registers outside of the load/store unit, wherein the remote ring bus is configured to convey an address of a second load or store operation associated with one of the plurality of remote registers concurrently with data associated with the second load or store operation.

13. The processing unit set forth in claim 12, wherein the plurality of local registers are associated with a corresponding plurality of local logical elements implemented in the load/store unit.

14. The processing unit set forth in claim 12, further comprising a queue for storing a plurality of entries, wherein each entry is configured to store information associated with the plurality of load or store operations, said information comprising the address of the first load or store operation, the data associated with the first load or store operation, the address of the second load or store operation, and the data associated with the second load or store operation.

15. The processing unit set forth in claim 12, further comprising a state machine for controlling operation of said at least one ring bus so that information stored in multiple entries of the queue are concurrently conveyed along said at least one ring bus.

16. A method, comprising:
concurrently conveying information associated with a plurality of load or store operations over at least one ring bus configured to communicatively couple a plurality of registers, wherein the plurality of registers are associated with a corresponding plurality of logical elements in a processor, wherein the information comprises an address of a first load or store operation, data associated with the first load or store operation, and at least one of an address of a second load or store operation or data associated with the second load or store operation, and wherein concurrently conveying information over said at least one bus comprises at least one of:
concurrently conveying information over a local ring bus that is implemented in a load/store unit in a processor core, wherein the local ring bus is communicatively coupled to a plurality of local registers within the load/store unit; or
concurrently conveying information over a remote ring bus that is communicatively coupled to the load/store unit and a plurality of remote registers outside of the load/store unit.

17. The method of claim 16, wherein concurrently conveying information over said at least one ring bus comprises concurrently conveying information provided by a load/store unit in a first mode of operation and information provided by a built-in self test element in a second mode of operation.

18. The method of claim 16, comprising iteratively advancing the address from the first entry and the data from the first entry to subsequent logical elements in subsequent time intervals until they are returned to the first entry in the queue.

19. A method, comprising:
concurrently conveying information associated with a plurality of load or store operations over at least one ring bus configured to communicatively couple the plurality of registers, wherein the plurality of registers are associated with a corresponding plurality of logical elements in a processor, wherein the information comprises an address of one of the plurality of registers and data associated with said one of the plurality of registers, and wherein the address and the data are conveyed on to said at least one ring bus in a plurality of consecutive time intervals, wherein concurrently conveying information over said at least one ring bus comprises providing an address from a first entry in a queue to a first logical element during a first time interval, bypassing transmission of information from the queue to the first logical element during a second time interval subsequent to the first time interval, and providing data from the first entry to the first logical element during at least one third time interval subsequent to the second time interval, wherein the queue is communicatively coupled to said at least one ring bus, and wherein the first, second, and third time intervals are consecutive time intervals.

20. A method, comprising:
concurrently conveying information associated with a plurality of load or store operations over at least one ring bus configured to communicatively couple the plurality of registers, wherein the plurality of registers are associated with a corresponding plurality of logical elements in a processor, wherein concurrently conveying information over said at least one ring bus comprises providing an address from a first entry in a queue to a first logical element during a first time interval, bypassing transmission of information from the queue to the first logical element during a second time interval subsequent to the first time interval, and providing data from the first entry to the first logical element during at least one third time interval subsequent to the second time interval, wherein the queue is communicatively coupled to said at least one ring bus; and
providing an address from a second entry in the queue to the first logical element during a fourth time interval subsequent to said at least one third time interval, bypassing transmission of information from the queue to the first logical element during a fifth time interval subsequent to the fourth time interval, and providing data from the second entry to the first logical element during at least one sixth time interval subsequent to the fifth time interval so that information from the first and second entries is concurrently conveyed by said at least one ring bus.

* * * * *